United States Patent [19]
Stoner

[11] 3,773,407
[45] Nov. 20, 1973

[54] EYE GLASSES
[76] Inventor: Elizabeth J. Stoner, 6950 Lemington Ave., Pittsburgh, Pa. 15206
[22] Filed: May 22, 1972
[21] Appl. No.: 255,677

[52] U.S. Cl. .................................. 351/41, 351/154
[51] Int. Cl. .......................... G02c 3/00, G02c 5/00
[58] Field of Search ...................... 351/41, 154, 124, 351/86, 54

[56] References Cited
UNITED STATES PATENTS
2,276,102  3/1942  Schwartz ............................. 351/86

*Primary Examiner*—David Schonberg
*Assistant Examiner*—Paul A. Sacher
*Attorney*—Buell, Blenko & Ziesenheim

[57] ABSTRACT

A pair of eye glasses with a nose bridge and a pair of temples wherein the bottom of each glass forms a straight perpendicular line from the base of the nose bridge connecting the two glasses together.

3 Claims, 1 Drawing Figure

PATENTED NOV 20 1973　　　　　　　　　　　3,773,407
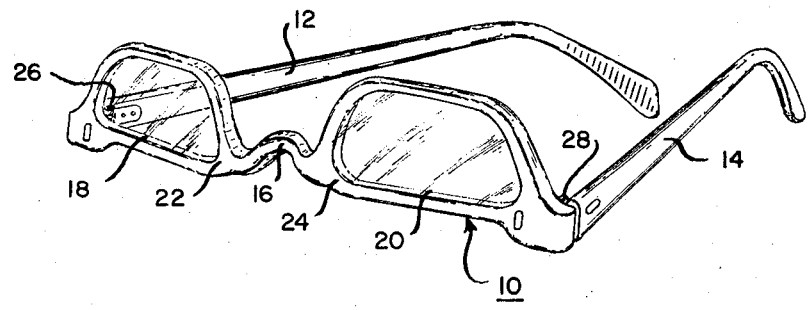

EYE GLASSES

This invention relates to a pair of eye glasses and more particularly to a pair of eye glasses suitable for a nearsighted person.

People wearing eye glasses have various problems for which the eye glasses are intended to correct. One is nearsightedness in which the user does not require glasses during close work, such as reading but does require glasses when viewing objects at a distance greater than that normally used for reading material. The present invention overcomes the requirement of removing the eye glasses whenever a nearsighted user intends to read or view work closer to the eye.

Other details, objects and advantages of the invention will become apparent as the following description of the present preferred structure of practicing the invention proceeds.

In the accompanying drawing I have illustrated a present preferred structure of practicing the invention of which The FIGURE is an isometric sketch of the eye glasses showing the invention.

The FIGURE shows a pair of eye glasses generally designated as 10 having a pair of temples 12 and 14 and a nose bridge 16 connecting glasses 18 and 20. The bottom of each glass 18 and 20 forms a straight perpendicular line from the base points 22 and 24 of the nose bridge 16. The temples 12 and 14 are pivoted at 26 and 28 respectively along the straight perpendicular line formed by the bottom of each glass 18 and 20. Suitable frames can enclose the glass 18 and 20 and the portion of the frame contacting the bottom portion of the glass 18 and 20 can be made of translucent material.

The use of such glasses permits a wearer or user without removing the glasses to read without looking through the glass or having vision obstructed by the frame. The nearsighted user is able when looking up from the reading material to see through the glass.

I claim:

1. A pair of eye glasses with a nose bridge and a pair of temples, the improvement conprising the bottom of each glass forming a straight perpendicular line through the base of the nose bridge connecting the two glasses together with the temples pivoted directly at the perpendicular line.

2. A pair of eye glasses as recited in claim 1 including a pair of frames framing the glass.

3. A pair of eye glasses as recited in claim 2 wherein the frames framing the bottom portions of the glass are translucent material.

* * * * *